United States Patent [19]
Claverie

[11] Patent Number: 6,160,222
[45] Date of Patent: *Dec. 12, 2000

[54] CABLE CONNECTION PROTECTING DEVICE

[75] Inventor: Béatrice Claverie, Paris, France

[73] Assignee: Câbles Pirelli, Saint-Maurice, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/976,510

[22] Filed: Nov. 24, 1997

[30] Foreign Application Priority Data

Nov. 25, 1996 [FR] France ................................. 96 14394

[51] Int. Cl.⁷ .................................................. H02G 15/04
[52] U.S. Cl. ............................................................. 174/93
[58] Field of Search ............................. 174/84 R, 88 R, 174/77 R, 92, 93, 74 R, 74 A, 75 R

[56] References Cited

U.S. PATENT DOCUMENTS

| | | |
|---|---|---|
| 2,191,544 | 2/1940 | Ruskin . |
| 3,141,060 | 7/1964 | Norton . |
| 3,209,061 | 9/1965 | Mier et al. . |
| 4,029,895 | 6/1977 | Scarborough . |
| 4,518,448 | 5/1985 | Henry et al. ........................... 174/92 X |
| 4,692,564 | 9/1987 | Campbell et al. ......................... 174/92 |
| 5,258,578 | 11/1993 | Smith et al. ............................... 174/93 |
| 5,403,977 | 4/1995 | Steptoe et al. ......................... 174/77 R |
| 5,589,666 | 12/1996 | DeCarlo et al. ...................... 174/93 X |
| 5,606,148 | 2/1997 | Escherich et al. ................ 174/84 R X |
| 5,711,116 | 1/1998 | Hasan .......................................... 52/58 |
| 5,753,861 | 5/1998 | Hansen et al. ............................. 174/93 |

FOREIGN PATENT DOCUMENTS

| | | |
|---|---|---|
| 0 695 014A1 | 1/1996 | European Pat. Off. . |
| 2 388 432 | 4/1978 | France . |
| 33 27 821A1 | 4/1984 | Germany . |
| 42 40 171A1 | 6/1994 | Germany . |

*Primary Examiner*—Kristine Kincaid
*Assistant Examiner*—Chau N. Nguyen
*Attorney, Agent, or Firm*—Finnegan, Henderson, Farabow, Garrett & Dunner, L.L.P.

[57] ABSTRACT

The present invention relates to a connection protecting device enabling cable ends to be sealingly connected. This device includes a rigid support mechanically connected to each of the cables, a flexible covering wrapping around the ends of the cables, and a seal onto which the flexible covering is applied and suitable for rendering the device tight around the ends of the cables.

15 Claims, 6 Drawing Sheets

CABLE CONNECTION PROTECTING DEVICE

BACKGROUND OF THE INVENTION

1. Field of the Invention

The present invention relates to a device for connecting cables. It applies, in particular, to underground connections for electric cables and fibre-optic cables, for power distribution mains or for signal transmission networks.

2. Description of the Related Art

Presently known connection devices comprise a rigid housing consisting of two half shells at the ends of which openings are provided. In these openings are positioned cables to be connected. These devices have numerous defects: on one hand, their rigidity leads to stresses when, for example, as a result of the elasticity or of the deformation of a site, the cables are shifted sideways or are no longer coaxial.

What is more, these devices, when transported and stored, take up considerable space and necessitate the use of perishable materials. Finally, they are not always easy to use in that the rigidity of the first portion of the housing hampers the user when connecting the cables.

SUMMARY OF THE INVENTION

The invention aims to overcome these drawbacks.

For this purpose, it proposes a cable connection protecting device, characterised in that it comprises a rigid support mechanically connected to each of the cables, a flexible covering wrapping around the ends of the cables, and a seal onto which the flexible covering is applied and which is suitable for rendering the device tight about the ends of the cables.

Thanks to these arrangements, the device according to the invention adjusts to the deformations generated or undergone by the cables without any deterioration in its performance.

According to special characteristics, the rigid support covers less than a third of each of the solid angles surrounding each of the ends of the cables. Thanks to this arrangement, access to said cable ends is facilitated.

According to other special characteristics, the rigid support has a bending strength substantially equal to that of each group of connected cables present at one end of the device. Thanks to this arrangement, the value of the bending strength, at the connection of the cables, is substantially equal to that of the cables, and there is no rigidity to adversely affect underground deformation of the cables.

According to other special characteristics, the seal is constituted by a pasty material protected, prior to the sealing of the device, by a removable film. Thanks to this arrangement, the removable film protects, on one hand, the pasty material and, on the other hand, the parts and the users who might come into contact therewith, up to the time the device is closed.

According to other characteristics, one end of the rigid support is connected to at least two cables, said end comprising a spacer positioned between said cables.

Thanks to this arrangement, tightness is ensured whatever the number of cables connected.

According to other special characteristics, the seal extends along the flexible covering between two ends of the support which are each connected to at least one cable.

Thanks to this arrangement, tightness is ensured by wrapping the flexible covering in a circular movement around the axes of the cables connected and around the rigid support.

According to other special characteristics, the seal comprises a butyl filler or mastic. Thanks to this arrangement, tightness is particularly efficiently ensured.

According to other special characteristics, the flexible covering comprises a metallic fabric. This metallic fabric may, or may not, be mechanically integral with the rest of the flexible covering. Thus, the device will be capable of withstanding blows with a pick. Preferably, said metallic fabric is grounded. Thus, if an electrical contact were to be created between one of the cables connected and the metallic fabric, the latter, being grounded, would not present any electrical risk. It should be noted here that the metallic fabric can, according to different embodiments, be located between the rigid support and the flexible covering, on one hand, or around the flexible covering, on the other hand. In the latter case, the metallic fabric is moulded over the flexible covering in such a way as to have the same shape as the latter.

According to other special characteristics, the rigid support bears fastening means, each suitable for being connected rigidly to a predetermined portion of the flexible covering. Thanks to this arrangement, the flexible covering is held sufficiently taut between the said predetermined portions, which are suitable for being held rigidly, to prevent the formation of a fold or crease that could break the seal.

Finally, according to other special characteristics, the rigid support is constituted by a thermoplastic material. Thanks to this arrangement, it is particularly easy to manufacture.

BRIEF DESCRIPTION OF THE DRAWINGS

Further advantages, objects and characteristics of the invention will emerge from the following description, given with reference to the annexed drawings, in which.

DESCRIPTION OF THE PREFERRED EMBODIMENTS

The forms of embodiment presented herein of the device according to the invention are, for example, intended for aluminum cables for the transport of low-voltage electricity, viz., less than 1 kV. The cross-sectional surface areas of the cables suitable for connection using the said devices range from 95 mm$^2$ to 240 mm$^2$.

Figure 1:
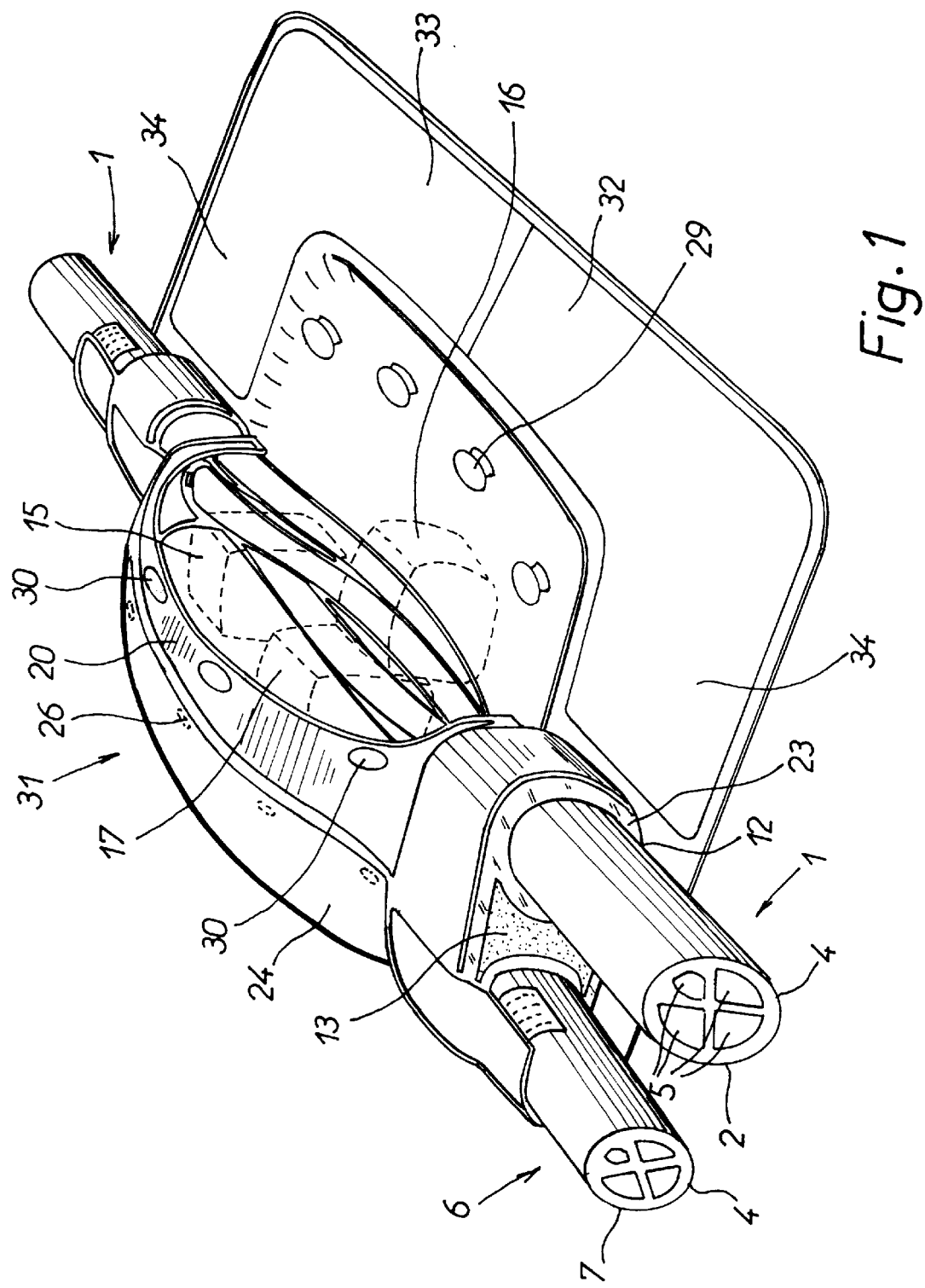
FIG. 1 shows a nodal connection device according to the present invention, suitable for connecting a branch cable to a main cable.

In FIG. 1, there is shown, to begin with, a main cable 1 intended to be electrically connected to a branch cable 6. Main cable 1 comprises, over its entire length, an outer sheath 2, which electrically insulates the cable, a steel tape or strip 4, which surrounds four leads (5), themselves composed of an insulating envelope which surrounds a conductive metal core.

The "branch" or "connected" cable 6 comprises, over its entire length, an outer sheath 7 which electrically insulates it, and a steel tape or strip 4 which surrounds four leads 8 identical with leads 5.

Between cables 1 and 6, a seal is accomplished by placing firstly two turns of butyl filler or mastic 12 on each of the cables, by positioning a spacer 13 between cables 1 and 6, and by placing two additional turns of mastic 23 on cables 1 and 6, and on spacer 13.

Clamping connectors 15, 16, 17, of a known type, and a connector 18 for neutral (not shown in FIG. 1) implement the electrical connections of the corresponding leads of cables 1 and 6.

According to a first characteristic of the present invention, a shell, or rigid support, 20 is placed over the cables and centred on the connection area. This rigid support possesses, according to an advantageous characteristic of the invention, an ability to withstand deformation similar to that of main cable 1. In cases where a group of more than one cable is present at one end, such as cables 1 and 6 in FIG. 1, the rigid support 20 should have a bending strength to withstand deformation substantially similar to that of the group of cables. To position rigid shell 20 on cables 1 and 6, the shell is opened and its ends are positioned on the connection areas, and the shell is held in place thanks to its elasticity. Two fixing clips or collars 21 connect support 20 to the cables present at one end or the other of the connection. In addition, a central fixing collar 22 (FIG. 4) clasps cables 1 and 6 and connects them to support 20. As shown in FIG. 1, a preferred embodiment of rigid support 20 does not completely surround the connection area, but instead, for example, only encompasses less than one third of the circumference around each cable end. In other words, the rigid support 20 occupies less than one third of the solid angle defined by the center line of the connection and an imaginary shell around the connection.

According to a main characteristic of the invention, a flexible covering 24 is attached to the rigid support by passing buttons 25 through buttonholes 26 in covering 24. They thus define a portion 31 of the covering, a portion which is put in place first. After covering 24 has been wrapped round, buttons 29 with which it is internally fitted are passed through buttonholes 30 in rigid support 20.

Mastic protection strips 32 and 33 protect a film of mastic that adheres to flexible covering 24. Their central portion is designed to be applied to the portion 31 of covering which has been placed first. The lateral portions 34 of the protective strips are placed over cables 1 and 6, and over spacer 13, in contact with the turns of mastic 23.

According to a preferred alternative (not shown), the film of mastic is positioned on the outer face of the portion 31 of covering that is placed first.

Figure 2:
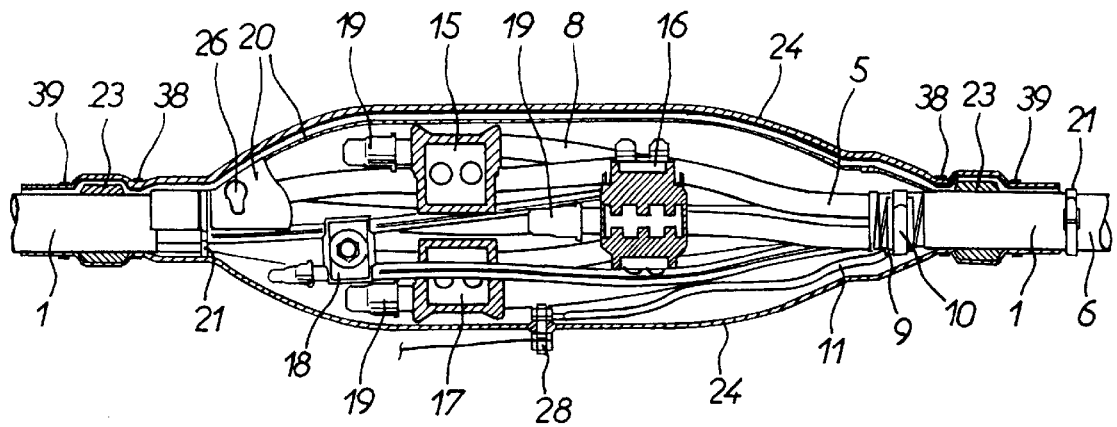
FIG. 2 is a longitudinal cross-sectional view of the device of FIG. 1.

FIG. 2 shows cables 1 and 6, leads 5 and 8 and a grounding connection 9 placed on the metal strip of main cable 1. A spring 10 turns once around said strip without surrounding the wires of a small cable 11; then, in the following turns, spring 10 surrounds cable 11, the lead wires of which are fanned out over the first turn of spring 10, for example. According to an alternative (not shown), cable 11 is integral with a strip slidable over the spring.

Cable 11 is then connected to the covering at a grounding point 28.

Figure 4:
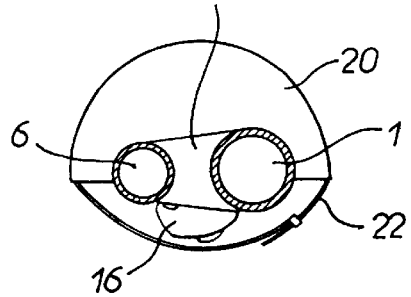
FIG. 4 is a transverse cross-sectional view of the attachment of a rigid support to interconnected cables, in a device such as the one shown in FIG. 1, as it is being installed.

Clamping connectors 15, 16 and 17, separated along the axes of cables 1 and 6, to avoid localised additional thicknesses, and a neutral connector 18 connect the corresponding leads of the two cables 1 and 6. Sealing caps 19, constituted by a PVC sheath, are placed on the ends of the leads. Rigid support 20 is held on the cables by the two fixing collars 21 and by the central fixing collar 22 (FIG. 4). Two turns of mastic 23 surround the cables and spacer 13. Flexible covering 24 comprises a metallic inner fabric 27 (not shown) and grounding point 28 by which this conductive fabric is electrically grounded. Finally, stainless steel collars 38 and 39 are positioned on the recesses of the covering and on the edges of the covering in the grooves in the covering provided for this purpose, and surround mastic 23.

Figure 3:
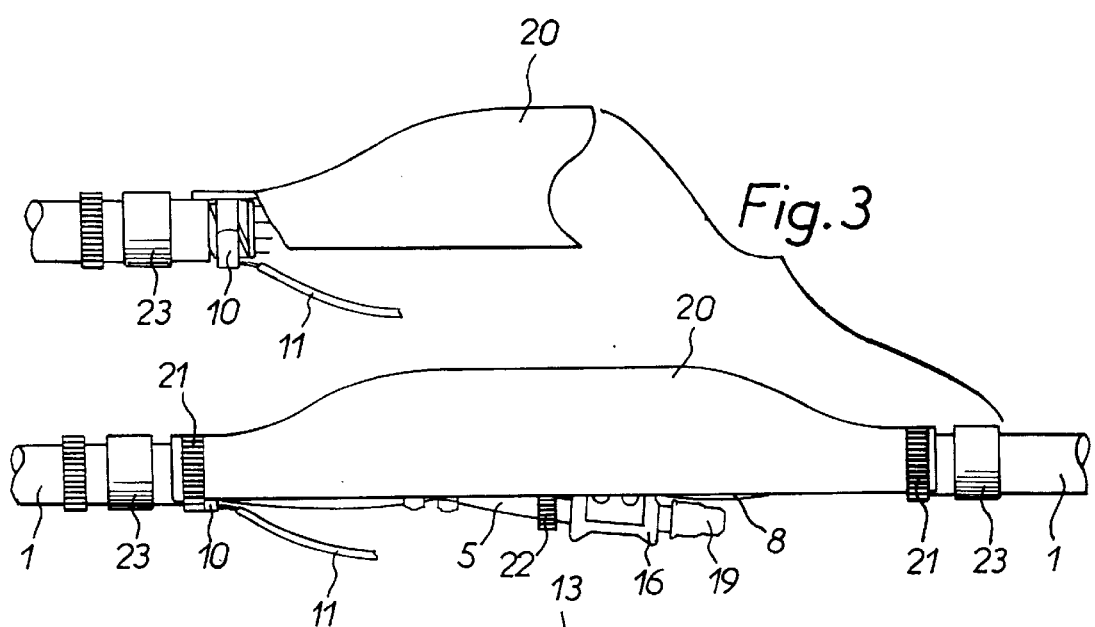
FIG. 3 is a longitudinal elevation view of the attachment of a rigid support to interconnected cables, in a device such as the one shown in FIG. 1, as it is being installed.

In FIGS. 3 and 4 can be seen rigid support 20, spring 10, cable 1, spacer 13, a connector 16, a cap 19, collars 21 for fixing to the cables, central fixing collar 2 which clasps leads 5 and 8 to support 20, and the two urns of mastic 23.

Figure 5:
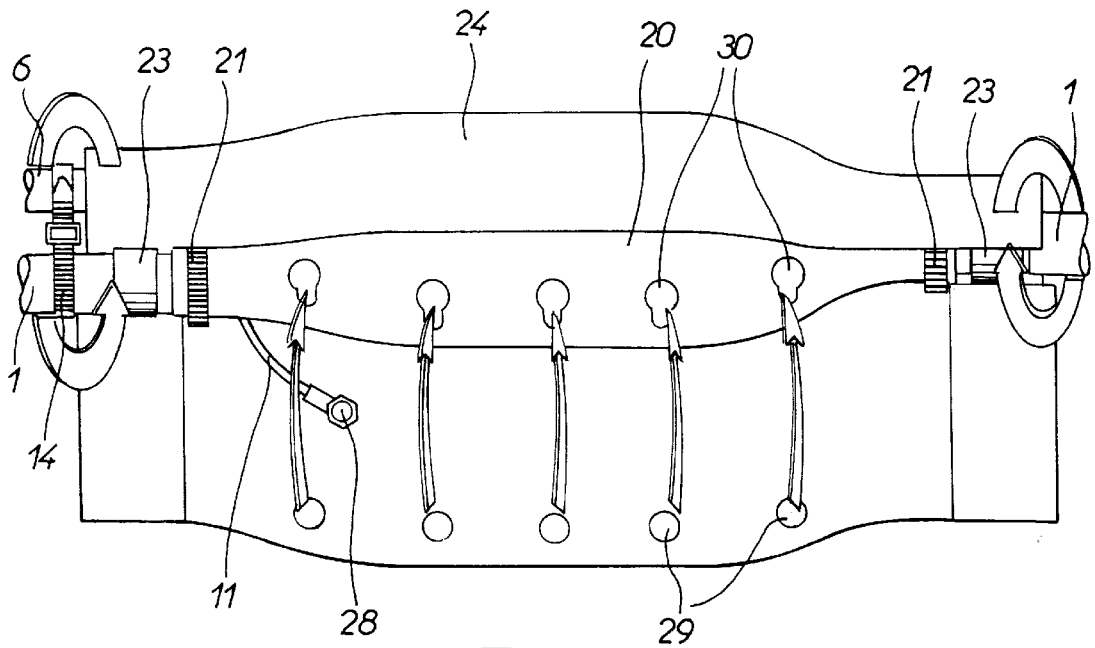
FIG. 5 shows the end of the wrapping of a flexible covering onto the rigid support, in a device such as the one shown in FIG. 1, as it is being installed.

FIG. 5 shows the end of the wrapping of flexible covering 24 around support 20 and cables 1 and 6. Two arrows placed to the right and the left of FIG. 5 and five arrows pointing from the bottom to the top of the Figure enable the movement of the covering to be visualised. In particular are to be seen cables 1 and 6, cable 11, a flange 14 which holds cables 1 and 6 around spacer 13 to exert a pressure, moderate but sufficient, of the cables on spacer 13 and on the mastic, in order to ensure tightness, rigid support 20, collars 21 for fixing to the cables, the two turns of mastic 23 on cables and spacers, flexible covering 24 which bears grounding point 28 and the anchoring buttons 29 which are inserted into buttonholes 30 of rigid support 20 by the movement indicated by the arrows.

The positioning of the buttons in the buttonholes makes it possible to ensure a tension over the surface of the flexible covering in the longitudinal direction, that is to say that at the edge of the flexible covering the most parallel to the axes of leads 5 and 8, no fold can form.

Figure 6:
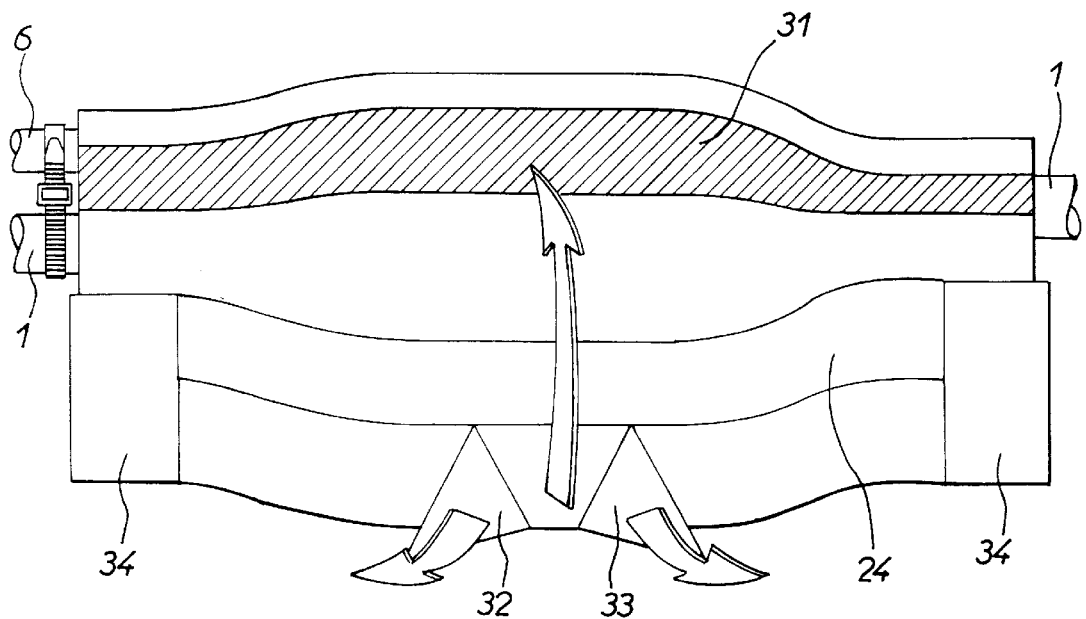
FIG. 6 shows the beginning of a sealing process for a device such as the one shown in FIG. 1, as it is being installed.
Figure 7:
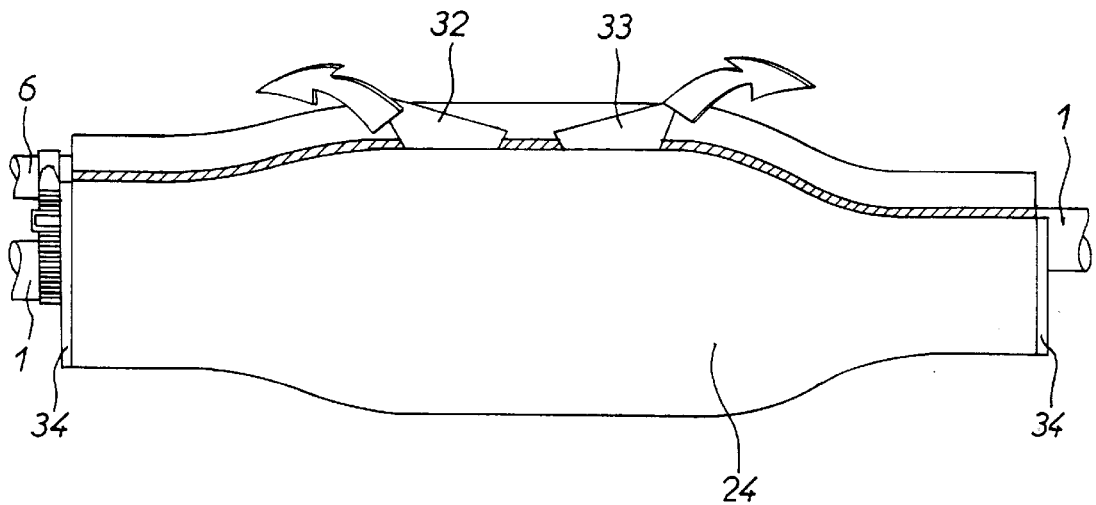
FIG. 7 shows a stage in the sealing process for a device such as the one shown in FIG. 1, as it is being installed.

In FIGS. 6 and 7 are to be found elements of FIG. 5, portion 31 of the covering placed the first having been cleaned to permit a better grip by the butyl mastic protected by mastic protection strips 32 and 33. To apply this mastic, beyond the two buttonholes presented hereabove, the ends of the mastic protection strips 32 and 33 are removed first (in the direction of the arrows in FIG. 6) and the portion of mastic thus uncovered is applied to the centre of the cleaned portion. Then, gradually, the strips are removed, the covering being applied gradually to the cleaned portion (FIG. 7). Finally, the lateral protective strips 34 are removed, and the edges of the covering are placed on the cables and spacers.

We would like to recall here that, according to one preferred embodiment (not shown), the film of mastic is positioned on the outer face of the portion 31 of the covering put in place the first.

Figure 8:
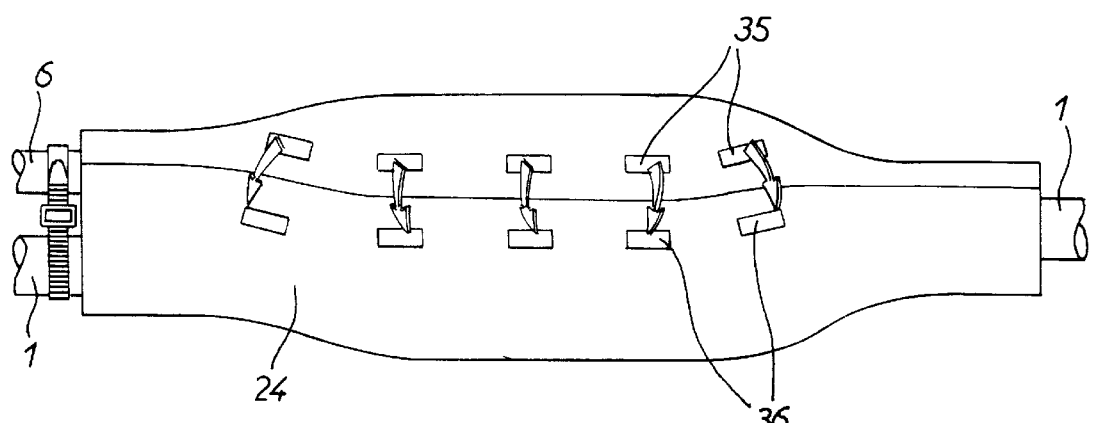
FIG. 8 shows a system for fastening the flexible covering after sealing in a device such as the one shown in FIG. 1, as it is being installed.
Figure 9:
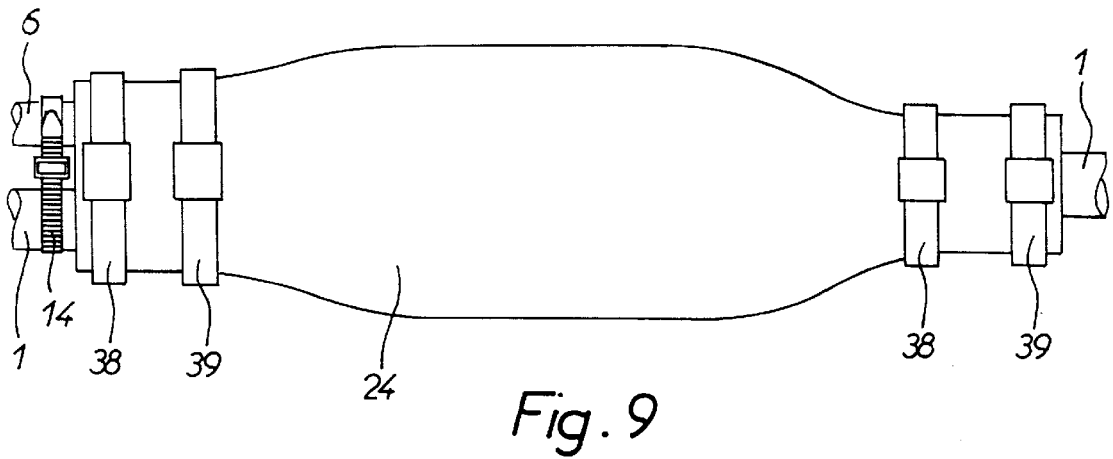
FIG. 9 shows the placement of clips or collars in a device such as the one shown in FIG. 1, as it is being installed.

After the mastic has been compacted by hand, through flexible covering 24, flap holes 35 are fitted over inserts 36 of covering 24 (FIG. 8). Then, collars 37 of plastic material are placed in inserts 36. Collars 38 and 39 made of stainless metal are then placed on the hollow portions of the covering and on the edges of the covering (FIG. 9), in the grooves provided for this purpose. These collars circumscribe mastic 23 in pockets.

Figures 11, 12:
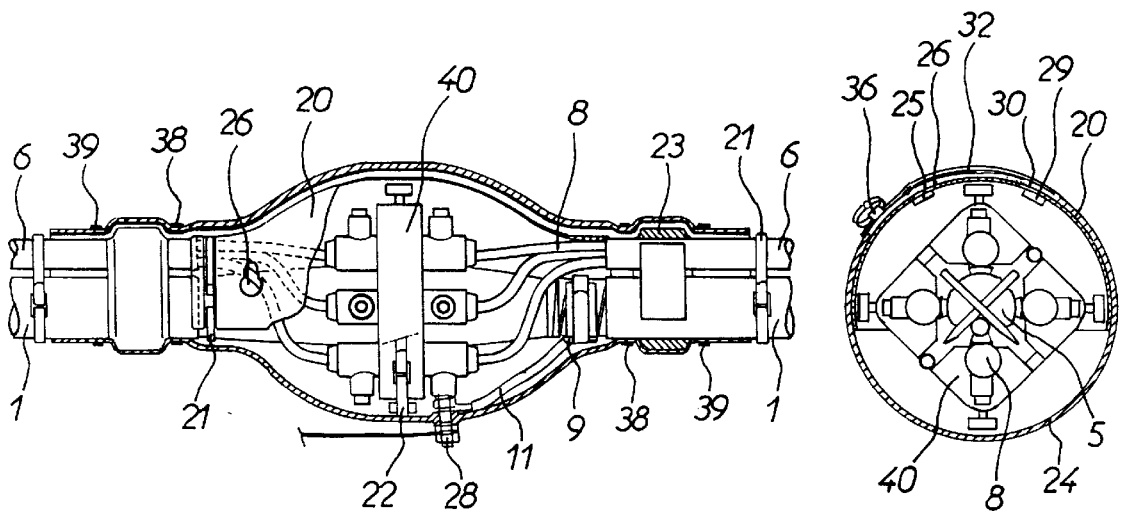
FIG. 11 is longitudinal cross-sectional view of the device shown in FIG. 10.
FIG. 12 is a transverse cross-sectional view of the device shown in FIG. 10.
Figure 10:
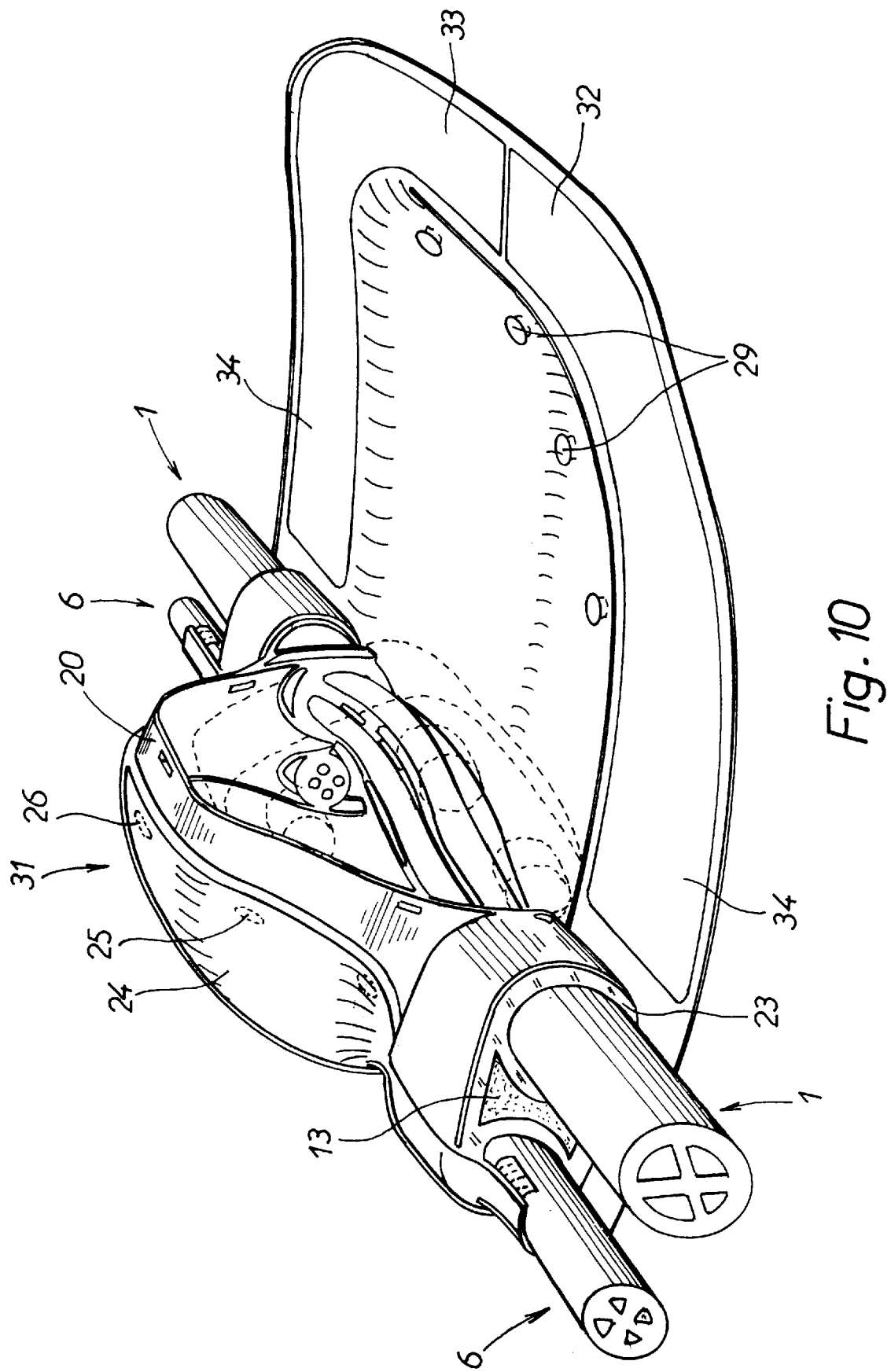
FIG. 10 shows a device for connecting branch cables according to the present invention, suitable for the connection of one or more branch cables to a main cable.

FIGS. 10, 11 and 12 show an alternative embodiment of the device illustrated in FIGS. 1 and 2, suitable for the connection of one or more branch cables 6 to a main cable 1. In the example shown, two branch cables 6 are connected.

In these Figures, we find the same elements as in FIGS. 1 and 2, the flexible covering being nonetheless longer to make a larger, but narrower, turn. In fact, a single cable connector 40 replaces separate cable connectors 15 to 18 of the preceding Figures, and all the connections are positioned here in parallel.

The device presented in FIGS. 10 to 12 is positioned in the same way as shown above in FIGS. 3 to 9.

According to some alternative embodiments, the attachments, inserts and buttons are replaced by other types of attachments, known to a man of the art, such as, for example, press-studs, strips known under the trade name of "VELCRO", adhesive tapes, hooks or rivets.

According to one alternative embodiment, not shown, support 20 is either "clipped" to the connection areas by opening a slot therein and by using the elasticity of the material composing said support, or rendered integral with the connection area by means of straps or collars. It is to be noted that the invention applies both to simple junctions between two cables and to more complex junctions, such as the ones described hereabove. Furthermore, the invention applies both to overhead junctions and to underground, overhead-underground and underwater junctions.

What is claimed is:

1. Device for protecting a connection of cable ends, comprising a rigid support mechanically connected to each of the cable ends, a flexible covering wrapping around the connected ends of the cables, and a seal onto which said flexible covering is applied, said seal being configured for rendering the device tight around the ends of the cables, wherein the rigid support encompasses less than an entire circumferential length surrounding the connection, and wherein the rigid support has a bending strength substantially equal to a combined bending strength of a group of connected cables present at one end of the connection.

2. Device according to claim 1, wherein the flexible covering comprises a metallic fabric.

3. Device according to claim 2, wherein said metallic fabric is grounded.

4. Device according to claim 1, wherein the rigid support encompasses less than one third of a circumferential length surrounding each of the cable ends.

5. Device according to claim 1, wherein the rigid support is made of a thermoplastic material.

6. Device according to claim 1, wherein one end of the rigid support is connected to at least two of said cables, and in that it comprises a spacer positioned between said two cables.

7. Device according to claim 1, wherein the seal is constituted by a pasty material protected, prior to the sealing of the device, by a removable film.

8. Device according to claim 7, wherein the seal comprises a butyl mastic.

9. Device according to claim 1, wherein the seal extends along the flexible covering between two ends of the support which are each connected to at least one of said cables.

10. Device according to claim 1, wherein the seal comprises a butyl mastic.

11. Device according to claim 1, wherein said cables comprise aluminum.

12. Device according to claim 11, wherein said cables have a cross-sectionial area of from 95 mm$^2$ to 240 mm$^2$.

13. Device for protecting a connection of cable ends, comprising a rigid support mechanically connected to each of the cable ends, a flexible covering wrapping around the ends of the cables, and a seal onto which said flexible covering is applied, suitable for rendering the device tight around the ends of the cables, wherein the rigid support bears fastening means each suitable for being rigidly connected to a predetermined portion of the flexible covering.

14. Device according to claim 13, wherein the seal comprises a butyl mastic.

15. Device according to claim 13, wherein said fastening means comprise buttons.

* * * * *